United States Patent
Yu (10) Patent No.: US 8,789,820 B2
(45) Date of Patent: Jul. 29, 2014

(54) DAMPER BEARING WITH TAPERING END FACES AND METHOD FOR THE PRODUCTION THEREOF

(75) Inventor: LingYa Yu, Shanghai Pu Dong (CN)

(73) Assignee: BASF SE, Ludwigshafen (DE)

( * ) Notice: Subject to any disclaimer, the term of this patent is extended or adjusted under 35 U.S.C. 154(b) by 359 days.

(21) Appl. No.: 13/089,877

(22) Filed: Apr. 19, 2011

(65) Prior Publication Data

US 2011/0260382 A1    Oct. 27, 2011

Related U.S. Application Data

(60) Provisional application No. 61/370,107, filed on Aug. 3, 2010.

(30) Foreign Application Priority Data

Apr. 21, 2010 (WO) ................. PCT/CN2010/071984

(51) Int. Cl.
  *B60G 11/22*    (2006.01)
(52) U.S. Cl.
  USPC ............................ 267/292; 267/141; 384/220
(58) Field of Classification Search
  USPC ............. 267/292, 140.12, 141, 141.1–141.7, 267/293, 294; 384/220, 222, 125, 202; 248/609, 632, 634, 635, 638
  See application file for complete search history.

(56) References Cited

U.S. PATENT DOCUMENTS 3,409,284 A * 11/1968 Rix ................................ 267/153
4,053,148 A * 10/1977 Chalmers ...................... 267/201
6,220,585 B1 * 4/2001 Heron ........................... 267/153
6,296,237 B1 * 10/2001 Nagai ............................ 267/220
6,659,437 B2 * 12/2003 Tatura ........................... 267/141
7,044,457 B2 * 5/2006 Bucksbee .................. 267/141.3
2009/0116772 A1   5/2009 Herman et al.

FOREIGN PATENT DOCUMENTS

| DE | 10 2004 027 904 A1 | 12/2005 |
| DE | 10 2005 009 667 A1 | 9/2006 |
| DE | 10 2007 011 209 A1 | 9/2007 |
| EP | 0 885 757 A2 | 12/1998 |
| JP | 63019439 | 1/1988 |
| JP | 4092275 | 3/1992 |
| JP | 2008174155 | 7/2008 |

OTHER PUBLICATIONS

International Search Report and Written Opinion of the International Search Authority issued Jan. 27, 2011, in Chinese Patent Application No. PCT/CN2010/071984.

* cited by examiner

*Primary Examiner* — Pamela Rodriguez
(74) *Attorney, Agent, or Firm* — Oblon, Spivak, McClelland, Maier & Neustadt, L.L.P.

(57) ABSTRACT

The invention relates to a damper bearing comprising a damper bearing housing, a damping element based on at least one elastomer being fitted into the damper bearing housing, the damping element comprising a basic body which has substantially the form of a hollow cylinder with an axis, an outer circumferential surface, an inner circumferential surface and, in the axial direction, two opposite end faces, and further comprising an insert being form-fitted connected with the damping element by fitting the insert into a recess in the inner circumferential surface, wherein at least one of the end faces of the damping element has a profile in which the thickness at the circumference decreases in the axial direction away from the basic body, and wherein the axial profile height of the end face increases from the inner circumferential surface towards the outer circumferential surface.

13 Claims, 4 Drawing Sheets

DAMPER BEARING WITH TAPERING END FACES AND METHOD FOR THE PRODUCTION THEREOF

BACKGROUND OF THE INVENTION

Field of the Invention

The invention relates to a damper bearing comprising a damper bearing housing, a damping element based on at least one elastomer being fitted into the damper bearing housing, the damping element comprising a basic body which has substantially the form of a hollow cylinder with an axis, an outer circumferential surface, an inner circumferential surface and, in the axial direction, two opposite end faces, and further comprising an insert being form-fitted connected with the damping element by fitting the insert into a recess in the inner circumferential surface. The invention also relates to a method for producing damping elements in which the individual damping elements are cut from a prefabricated elastomer tube by means of a cutting tool.

Damper bearings which comprise damping elements based on elastomers are used within the chassis in automobiles and are generally known, for example from DE 10 2004 027 904 A1, DE 10 2005 009 667 A1 or DE 10 2007 011 209 A1. They are used in automobiles in particular as vibration-damping, decoupling and isolating suspension elements. These suspension elements thereby undertake the connection of the shock absorber to the body and/or to components of the chassis. Such coupling has the effect of damping, decoupling or isolating vibrations that are caused by the roadway and passed on via the wheel and the shock absorber, as well as vibrations caused by the shock absorber itself. The coupling is configured such that cardanic movements of the shock absorber are made possible and the requirements as to force/travel characteristics are fulfilled. Depending on the chassis design, these characteristics significantly influence the driving behavior and must be made to match exactly the respective type of vehicle or the vehicle components to be decoupled. The interaction of shock absorber and damper bearing ensures the following functions:

driving comfort
driving safety
roll/pitch support
reduction of effects of wheel jolt and body tremble.

SUMMARY OF THE INVENTION

Damping elements are usually installed in a prestressed state in a damper bearing housing, contouring of the axial end faces bringing advantages with respect to the damping behavior. However, damping elements of this type are complex in their production and are consequently expensive.

It was an object of the invention to provide a damper bearing with a damping element which has the desired damping properties in the axial and radial directions but can be produced more easily and at lower cost than known components.

This object is achieved by the subject matter of the invention as described below.

Thus, a first embodiment of the present invention is directed to a damper bearing comprising
a damper bearing housing,
a damping element (1) based on at least one elastomer, the damping element (1) being fitted into the damper bearing housing, the damping element (1) comprising a basic body (10) which has substantially the form of a hollow cylinder with an axis (20), an outer circumferential surface (24), an inner circumferential surface (16) and, in the axial direction, two opposite end faces (12), and
an insert (40) being form-fitted connected with the damping element (1) by fitting the insert (40) into a recess (30) in the inner circumferential surface (16), wherein at least one of the end faces (12) of the damping element (1) has a profile (14) in which the thickness at the circumference decreases in the axial direction away from the basic body (10), and wherein the axial profile height of the end face (12) increases from the inner circumferential surface (16) towards the outer circumferential surface (24).

The second embodiment of the invention relates to the damper bearing according to the first embodiment described above, wherein all peaks of the profile of the end face (12) are located within an inward extent perpendicular to the outer circumferential surface (24) of the basic body (10) of the damping element (1) of from 0% to 50%, preferably from 0% to 35%, in particular from 0% to 25% relating to the thickness at the circumference at the profile base.

The third embodiment of the invention relates to the damper bearing according to the first or second embodiment described above, wherein the thickness at the circumference of the damping element (1) decreases to such an extent that the thickness at the circumference at the top of the end face (12) corresponds to 0% to 50%, in particular 10% to 30% of the thickness at the circumference at the profile base.

The fourth embodiment of the invention relates to the damper bearing according to the first, second or third embodiment described above, wherein the decrease in the thickness at the circumference of the damping element (1) takes place linearly.

The fifth embodiment of the invention relates to the damper bearing according to the fourth embodiment described above, wherein the angle of slope (18) between the rising end face (12) and the perpendicular (22) to the axis (20) of the damping element (1) being from 15° to 60°, preferably from 20° to 40°, in particular from 25° to 35°.

The sixth embodiment of the invention relates to the damper bearing according to the first to fifth embodiment described above, wherein the outer circumferential surface (24) of the basic body (10) of the damping element (1) has at least one indentation (28), which extends at least partially over the entire circumference, the inward extent of the indentation (28) perpendicularly to the outer circumferential surface (24) is from 1% to 50%, preferably from 2% to 30%, in particular from 5% to 25% of the thickness at the circumference, wherein the remainder of the thickness at the circumference measured outwardly from the inner circumferential surface (16) is not less than 4 mm, preferably not less than 6 mm.

The seventh embodiment of the invention relates to the damper bearing according to the sixth embodiment described above, wherein the at least one indentation (28) extends over the entire circumference of the outer circumferential surface (24), such that the outer region of the end surface (12) forms a bending lip, the distance between the middle of the indentation (28) and the highest profile height in the axial direction being from 0.2 cm to 1.5 cm, preferably from 0.2 cm to 0.8 cm, in particular from 0.2 cm to 0.4 cm.

The eighth embodiment of the invention relates to the damper bearing according to the first to seventh embodiment described above, wherein the basic body (10) of the damping element (1) has an annular cross-sectional area.

The ninth embodiment of the invention relates to the damper bearing according to the first to eighth embodiment described above, wherein the outer diameter of the basic body (10) of the damping element (1) is from 3.5 cm to 8.5 cm, preferably from 4 cm to 7.5 cm, in particular from 5 cm to 7 cm, and the height of the damping element (1) is from 1.5 cm to 5 cm, preferably from 2 cm to 3.5 cm, in particular from 2.2 cm to 2.8 cm.

The tenth embodiment of the invention relates to the damper bearing according to the first to ninth embodiment described above, wherein the outer circumferential surface (24) of the basic body (10) of the damping element (1) has at least one elevation (26), the outward extent of which perpendicularly to the circumferential surface (24) is from 0.5 mm to 8 mm, preferably from 0.5 mm to 6 mm, in particular from 0.5 mm to 4 mm.

The eleventh embodiment of the invention relates to the damper bearing according to the tenth embodiment described above, wherein the at least one elevation (26) extends over the entire circumference of the outer circumferential surface (24).

The twelfth embodiment of the invention relates to the damper bearing according to the first to eleventh embodiment described above, wherein the two end faces (12) of the damping element (1) having a profile (14) in which the thickness at the circumference decreases in the axial direction away from the basic body (10).

The thirteenth embodiment of the invention relates to the damper bearing according to the first to twelfth embodiment described above, in which the two end faces (12) of the damping element (1) having the same profile (14).

The fourteenth embodiment of the invention relates to the damper bearing according to the first to thirteenth embodiment described above, in which the elastomer of the damping element (1) is a cellular polyisocyanate polyaddition product.

The fifteenth embodiment of the invention relates to a method of producing a damper bearing according to the first to the fourteenth embodiment described above in which the individual damping elements are cut from a prefabricated elastomer tube by means of a cutting tool.

DETAILED DESCRIPTION OF THE INVENTION

The three-dimensional shape of damping elements according to the invention is characterized by a basic body, which has substantially the form of a hollow cylinder with an axis, an outer circumferential surface directed away from the axis, an inner circumferential surface facing the axis and, in the axial direction, two opposite end faces. The basic body may have any desired cross-sectional areas, but the basic body is preferably axially symmetrical. To be regarded here as the cross section is a section through a plane perpendicular to the axis. In a further preferred embodiment, the cross-sectional area of the basic body is annular, and so the basic body is rotationally symmetrical with respect to the axis.

The thickness at the circumference refers to the spacing, that is to say the shortest distance, between the inner circumferential surface and the outer circumferential surface. In the case of the annular cross-sectional area of the basic body, the thickness at the circumference is identical in all radial directions. In the case of other cross-sectional areas, the thickness at the circumference may assume different values in different radial directions. In the case of a cross-sectional area in which the inner and outer circumferential surfaces are concentric squares, the thickness at the circumference assumes the same value along the edges, whereas it increases in the corners. By appropriate rounding of the corners of the inner and outer circumferential surfaces, the same value of the thickness at the circumference as along the edges can be realized in the corners. Different values of the thickness at the circumference in different radial directions are also obtained if the cross sections of the inner and outer circumferential surfaces are not concentric or have different forms.

The word "substantially", used with respect to the form of the hollow cylinder, should be understood as meaning that slight deviations from the strictly geometric definition of a hollow cylinder are considered to be covered by the embodiments according to the invention. An example of what may be considered slight is a variation of the thickness at the circumference of the basic body in the axial direction of up to 10%.

According to the invention, at least one of the two end faces deviates from the strictly geometric definition of a hollow cylinder in that it has a profile in which the thickness at the circumference decreases in the axial direction away from the basic body. Preferably, both end faces have a corresponding profile. In a particularly preferred embodiment, both end faces have the same profile.

The height of the damping element should be understood as meaning the maximum axial extent and is defined as the spacing between two planes which are perpendicular to the axis and are placed against the highest points of the opposite end faces respectively in the axial direction. The height is preferably from 1 cm to 10 cm, more preferably from 1.5 cm to 5 cm, particularly preferably from 2 cm to 3.5 cm, in particular from 2.2 cm to 2.8 cm.

The diameter of the outer circumferential surface of the basic body refers to the greatest spacing between two points on the circumferential line of a cross section perpendicular to the axis through the basic body. Examples of diameters in the case of non-circular profiles are the major axis in the case of an ellipse or the spacing between two opposite corners in a regular polygon with an even number of edges, for example the diagonal in a square. In the case of the preferred axially symmetrical forms, the diameter is measured on a line which passes through the axis. The diameter of the outer circumferential surface is preferably from 1 cm to 30 cm, more preferably from 2 cm to 15 cm, more preferably from 3 cm to 10 cm, more preferably from 3.5 cm to 8.5 cm, particularly preferably from 4 cm to 7.5 cm, in particular from 5 cm to 7 cm.

The outer surface of the damping element in the radial direction is smooth or contoured, preferably it is contoured. Contoured means that the surface has contour elements with respect to the smooth outer circumferential surface of the basic body, for example elevations and/or indentations.

In one configuration according to the invention, the outer circumferential surface of the basic body has at least one elevation, the maximum outward extent of which perpendicularly to the smooth circumferential surface is preferably from 0.5 mm to 8 mm, particularly preferably from 0.5 mm to 6 mm, in particular from 0.5 mm to 4 mm. With the aforementioned definition of the diameter of the basic body, the elevation is disregarded. In a further advantageous configuration, the elevation extends over the entire circumference of the outer circumferential surface. Further preferred is an embodiment in which there are on the outer circumferential surface of the basic body two elevations running continuously around the periphery and spaced axially apart from each other.

In another configuration according to the invention, the contour elements are individual elements arranged such that they are distributed over the outer circumferential surface. The contour elements advantageously take the form of nubs. The nubs are preferably uniformly distributed over the circumference. In a preferred embodiment, on the outer circumferential surface there are a multiplicity of nubs, which taper outwardly to a point away from the circumferential surface and are arranged in such a way that, in a cross section perpendicular to the axis, a star-shaped contour of the outer circumferential surface is obtained.

In the case of a further advantageous embodiment, the outer circumferential surface of the basic body has at least one indentation at least partially running around the periphery, the inward extent of the indentation perpendicularly to the circumferential surface is preferably from 1% to 50%, particularly preferably from 2% to 30%, in particular from 5% to 25% of the thickness at the circumference, the remaining thickness at the circumference is preferably not less than 4 mm, particularly preferably not less than 6 mm, measured outwardly from the inner circumferential surface. In a further advantageous configuration, the at least one indentation extends over the entire circumference of the outer circumferential surface. In a further advantageous configuration there are on the outer circumferential surface of the basic body two indentations running continuously around the periphery and spaced axially apart from each other.

The inner surface of the damping element in the radial direction is smooth or contoured, preferably it is contoured. Contoured means that the surface has contour elements with respect to the smooth inner circumferential surface of the basic body, for example elevations and/or indentations.

In one configuration according to the invention, the inner circumferential surface of the basic body has at least one elevation, the maximum inward extent of which perpendicularly to the smooth circumferential surface is preferably from 0.5 mm to 8 mm, particularly preferably from 1 mm to 6 mm, in particular from 2 mm to 4 mm. In a further advantageous configuration, the elevation extends over the entire circumference of the inner circumferential surface. Further preferred is an embodiment in which there are on the inner circumferential surface of the basic body two elevations running continuously around the periphery and spaced axially apart from each other.

In another configuration according to the invention, the contour elements are individual elements arranged such that they are distributed over the inner circumferential surface. The contour elements advantageously take the form of nubs. The nubs are preferably uniformly distributed over the circumference. In a preferred embodiment, on the inner circumferential surface there are a multiplicity of nubs, which taper inwardly to a point away from the circumferential surface and are arranged in such a way that, in a cross section perpendicular to the axis, a star-shaped contour of the inner circumferential surface is obtained.

In the case of a further advantageous embodiment, the inner circumferential surface of the basic body has at least one indentation, the outward extent of which perpendicularly to the circumferential surface is preferably from 1% to 50%, particularly preferably from 2% to 30%, in particular from 5% to 25% of the thickness at the circumference, the remaining thickness at the circumference is preferably not less than 4 mm, particularly preferably not less than 6 mm, measured inwardly from the outer circumferential surface. In a further advantageous configuration, the indentation extends over the entire circumference of the inner circumferential surface. Further preferred is an embodiment in which there are on the inner circumferential surface of the basic body two indentations running continuously around the periphery and spaced axially apart from each other.

All combinations of elevations and indentations on the outer and inner circumferential surfaces are covered by the invention. Depending on the requirements for the damping element and depending on the elastomer used, a person skilled in the art would at any time configure the elevations and indentations in such a way that they correspond to the respective installation space and the decoupling properties.

In a further preferred embodiment, the damping element has a rough surface. A rough surface is understood as meaning that on the surface there are structural elements, distributed uniformly or irregularly. The height or depth of the structural elements perpendicularly to the respective surface is preferably from 0.1% to 1%, in particular from 0.2% to 0.5%, of the diameter of the outer circumferential surface. With a diameter of 30 cm, a surface is considered to be rough if it has structural elements with a height or depth of up to 3 mm. With a diameter of 50 mm, this value is 0.5 mm.

According to the invention, the elevations described above differ from the roughness of a surface. In the above example of the damping element with an outside diameter of 30 cm and a roughness of 3 mm, an elevation must protrude at least 0.5 mm above the rough surface to be considered to be an elevation. With respect to the smooth surface, the elevation must therefore have a value of 3.5 mm.

The damping element preferably has a rough surface at least at some of the locations at which it is in contact with other components in the installed state, more preferably all surfaces that are in contact with other components are rough. The rough configuration of the surface allows undesired noises such as squeaking to be reduced or even avoided entirely.

In further preferred embodiments, the inner circumferential surface of the basic body has a recess in which an insert can be introduced with a form fit. Installed in automobiles, the insert serves for fixing the shock absorber. Preferably, the surface of the basic body in the region of the recess is rough at least at some of the locations at which it is in contact with the insert, more preferably everywhere where it is in contact with the insert.

Elevations are preferably integrally bonded with the basic body. For example, in the case of foamed damping elements, they may be produced by the mold comprising corresponding contours. They may, however, also be produced by a basic body with a greater outside diameter and/or smaller inside diameter than the respective nominal diameters being produced and the elevations subsequently being formed from the basic body by material-removing processes, for example turning or milling. Indentations may, for example, likewise be created by material-removing processes such as cutting, turning or milling. Corresponding processes are known to a person skilled in the art.

According to the invention, the damping element has two end faces, which are opposite in the axial direction and at least one of which, preferably both, has or have a profile in which the thickness at the circumference decreases in the axial direction away from the basic body. In this connection, the profile should be understood as meaning the outer contour of a longitudinal section through the damping element parallel to the axis. The profile always refers to a longitudinal section through the shortest distance between the outer and the inner circumferential surface. In the case of a rotationally symmetrical basic body, the longitudinal section consequently passes through the axis and corresponds to a section in the radial direction.

In the case of a square basic body, for example, the longitudinal section for the definition of the profile passes parallel to the axis and perpendicularly to the edges of the square. If the corners of the square are rounded, the longitudinal section is taken radially in a way corresponding to the curvature of the rounding. In the case of pointed corners, a singularity is obtained on account of the discontinuity of the circumferential line, so that strictly speaking no direction is defined for the longitudinal section. In such a situation, the corner is infinitesimally approximated by roundings and the longitudinal sections are taken in the direction of the respective radial directions.

At the transition from the hollow cylinder into the region of decreasing thickness at the circumference, a plane can be defined perpendicularly to the axis. This plane is referred to as the profile base. In the case of this definition, elevations or indentations of the outer or inner circumferential surface of the basic body are disregarded. The profile ends in the axial direction furthest away from the basic body in a profile tip. The profile height refers to the spacing, that is to say the shortest distance, in the axial direction between the profile base and the profile tip. The profile width refers to the spacing between the outer and the inner circumferential surface at the profile base, once again disregarding elevations or indentations in the circumferential surfaces. The spacing is obtained from the longitudinal section for the definition of the profile. The profile width corresponds to the thickness at the circumference at the profile base, in this respect disregarding elevations or indentations.

Any number of longitudinal sections, and consequently profiles, can be defined along the circumferential line of the cross-sectional form of the basic body. With respect to the associated profile width, the profile tip then respectively lies at a specific point, which may be between 0% and 100% of the profile width. Preferably, the profile height has the same value for each of these points along the circumferential line, that is to say the maximum axial extent of this end face of the damping element is the same in every radial direction. Preferably, all peaks of the profile of the end face are located within an inward extent perpendicular to the outer circumferential surface of the basic body of the damping element of from 0% to 50%, particularly preferably from 0% to 35%, in particular from 0% to 25% relating to the thickness at the circumference at the profile base. A value of 0% means that the profile height is increasing over the complete profile width, the profile tip forming the outermost edge of the end face. A value of 50% means that the profile tip is reached after half the profile width.

In a further preferred embodiment, the profile tips of each profile lie at the same location with respect to the profile width. For a damping element with an annular cross section, this means that the profile tips also form a circle in the cross-sectional plane. In the case of a damping element with a cross section of the basic body comprising concentric squares, for example, this means that the profile tips also form a further concentric square in the cross-sectional plane.

The profiles may be differently configured, as long as the thickness at the circumference in the axial direction decreases away from the basic body. According to the invention, the decrease in the thickness at the circumference proceeding from the profile base takes place from the inside outward, meaning that the profile height in the axial direction increases from the inside outward. "From the inside outward" means in this case the direction from the inner to the outer circumferential surface of the basic body. In the case of a rotationally symmetrical basic body, this corresponds to an increasingly larger radius from the axis toward the outer circumferential surface.

In an advantageous configuration the thickness at the circumference of the damping element decreases along the profile in the axial direction to such an extent that the thickness at the circumference at the top of the end face preferably corresponds to 0% to 50%, in particular 10% to 30% of the thickness at the circumference at the profile base. A value of 0% means that the profile tip is formed as a true tip. For values greater than 0% the profile tip preferably is formed as a plateau where all peaks of that end face of the damping element have the same value concerning the profile height.

The decrease in the thickness at the circumference, and consequently the increase in the profile height, may proceed linearly or nonlinearly in the profile from the inside outward, for example concavely or convexly, when considered over the profile width. In a preferred embodiment the decrease in the thickness at the circumference takes place linearly from the inside outward.

An advantageous configuration of the invention, including with regard to production engineering aspects, is obtained if the increase in the profile height takes place with a constant slope. The angle of slope, which is defined as the acute angle between the area of the end face rising in the direction of the profile width and the perpendicular to the axis of the damping element, is preferably from 15° to 60°, particularly preferably from 20° to 40°, in particular from 25° to 35°.

A further preferred configuration of the damping element according to the invention provides that the outer circumferential surface of the basic body has at least one indentation running around the periphery, such that the outer region of the end face forms a bending lip. Advantageous damping properties can be obtained by locating the at least one indentation such that the spacing between the centre of the indentation and the highest profile height in the axial direction is preferably from 0.2 cm to 1.5 cm, particularly preferably from 0.2 cm to 0.8 cm, in particular from 0.2 cm to 0.4 cm. Particularly preferably, this indentation is at the height of the profile base in the axial direction. The minimum material thickness of the bending lip formed by the indentation is preferably from 1 mm to 8 mm, particularly preferably from 1 mm to 5 mm, in particular from 1 mm to 3.5 mm.

Damping elements according to the invention may be produced from generally known elastic materials, for example from rubber. Damping elements according to the invention are preferably produced on the basis of cellular polyisocyanate polyaddition products, particularly preferably on the basis of cellular polyurethane elastomers, which may comprise polyurea structures. In this connection, cellular means that the cells preferably have a diameter of from 0.01 mm to 0.5 mm, particularly preferably from 0.01 mm to 0.15 mm.

Particularly preferably, the cellular polyisocyanate polyaddition products have at least one of the following material properties: a density to DIN EN ISO 845 of between 200 and 1100 kg/m$^3$, preferably between 270 and 900 kg/m$^3$, a tensile strength to DIN EN ISO 1798 of 2.0 N/mm$^2$, preferably between 2 and 8 N/mm$^2$, an elongation at break to DIN EN ISO 1798 of 200%, preferably 230%, particularly preferably between 300 and 700%, or a tear propagation resistance to DIN ISO 34-1 B (b) of 6 N/mm, preferably of 8 N/mm, particularly preferably of 10 N/mm. In further preferred embodiments, the cellular polyisocyanate polyaddition product has two, more preferably three, of these material properties; particularly preferred embodiments have all four of the material properties mentioned.

Elastomers based on cellular polyisocyanate polyaddition products and their preparation are generally known and variously described, for example in EP 62 835 A1, EP 36 994 A2, EP 250 969 A1, EP 1 171 515 A1, DE 195 48 770 A1 and DE 195 48 771 A1.

The preparation usually takes place by reacting isocyanates with compounds that are reactive to isocyanates. In a preferred embodiment, the cellular polyurethane elastomers are prepared on the basis of the isocyanates diisocyanatotoluene (TDI), naphthalene diisocyanate (NDI), most particularly preferably on the basis of 2,6-diisocyanatotoluene (TODI) and 1,5-naphthalene diisocyanate (5-NDI).

The damping elements based on cellular polyisocyanate polyaddition products are usually prepared in a mold in which the reactive starting components are reacted with one another. Conventional molds, for example metal molds, which by their form ensure the three-dimensional form according to the invention of the damping element, generally come into consideration here as molds.

The preparation of the polyisocyanate polyaddition products may take place on the basis of generally known methods, for example by using the following starting materials in a one-stage or two-stage process:
(a) isocyanate,
(b) compounds reactive to isocyanates,
(c) water and, if appropriate,
(d) catalysts,
(e) blowing agents and/or
(f) auxiliaries and/or additives, for example polysiloxanes and/or fatty acid sulfonates.

The surface temperature of the inner wall of the mold is usually from 40 to 95° C., preferably from 50 to 90° C. The production of the molded parts is preferably carried out using an NCO/OH ratio of from 0.85 to 1.20, the heated starting components being mixed and introduced into a heated, preferably tightly closing mold in an amount corresponding to the desired density of the molded part. The molded parts are cured after 5 to 60 minutes and consequently can be demolded. The amount of reaction mixture introduced into the mold is usually set such that the moldings obtained have the density already described. The starting components are usually introduced into the mold at a temperature of from 15 to 120° C., preferably from 30 to 110° C. The degrees of compaction for producing the moldings lie between 1.1 and 8, preferably between 2 and 6.

The cellular polyisocyanate polyaddition products are expediently prepared by the one-shot process with the aid of the low-pressure technique or, in particular, the reaction injection-molding technique (RIM) in open or preferably closed molds. The reaction is carried out in particular with compaction in a closed mold. The reaction injection-molding technique is described, for example, by H. Piechota and H. Rohr in "Integralschaumstoffe" [integral foams], Carl Hanser-Verlag, Munich, Vienna 1975; D. J. Prepelka and J. L. Wharton in Journal of Cellular Plastics, March/April 1975, pages 87 to 98, and U. Knipp in Journal of Cellular Plastics, March/April 1973, pages 76-84.

The damping element may be produced by known foaming methods in molds. In that case, it is preferred first to place the insert into the mold, to fix it there and then to introduce the reaction mixture into the mold and allow it to cure. The inner surfaces of the mold and the surfaces of the insert are in this case preferably provided with conventional release agents, for example based on wax or silicone, or in particular with aqueous soap solutions. This ensures that the finished damping elements including the insert can be easily removed from the mold and any removal of flash on the insert can be carried out easily.

Preferably, the damping element is produced by mechanical working of a foamed tube. By contrast with damping elements with contoured end faces, as are known from the prior art, for example DE 10 2005 009 667, the damping elements according to the invention can be produced at low cost in a simple way by cutting a tube. Contour elements on the inner and/or outer surface can be produced by mechanically working the tube, for example by machining processes such as turning. If technically possible and advisable, for example in the case of contiguous elevations that extend in the axial direction, they are preferably already produced during the foaming of the tube.

Damping elements according to the invention are preferably used as damper bearings in motor vehicles, in particular for the connection of the shock absorber to the body or to components of the chassis. For this purpose, the damping elements are provided with an insert, which is enclosed by the damping element in the axial direction and the outer radial direction. The insert may be produced from known, preferably hard materials, for example metals, rigid plastics or composite materials. Suitable plastics are, for example, thermoplastic polyurethane, polyamide, polyethylene, polypropylene, polystyrene or, preferably, polyoxymethylene. Metals are preferably used, particularly preferably steel or aluminum, in particular aluminum.

In comparison with known components, for example with wavy contouring of the end faces, damping elements according to the present invention have comparatively good or better damping properties, which are reflected in virtually identical profiles of characteristic force-displacement curves and characteristic stiffness-displacement curves. However, they are much less costly to produce than these components, since tubeware can be produced on comparatively simple machines, whereas components contoured at the end faces have to be produced in individual molds or laboriously milled.

According to the invention, a damper bearing includes a damping element as described above. A damper bearing is understood as meaning a connecting element between a component A and a component B, one of the components, for example component B, being in motion, at least for a time, and the damping element having the task of reducing, ideally preventing, the transmission of the movement from component B to component A. This process is also referred to as decoupling or isolating the motion. The damper bearing further comprises a damper bearing housing and an insert being form-fitted connected with the damping element by fitting the insert into a recess in the inner circumferential surface. Preferably, the damper bearing housing is fixedly connected to component A, whereas component B is fixedly connected to the insert in the damping element.

The damping element is fitted into the damper bearing housing. Preferably, the damping element is in permanent contact with the damper bearing housing, which means that, even when there are extreme deflections of the component B, the contact between the damping element and the damper bearing housing is not completely interrupted in any of the three spatial directions.

More preferably, the damping element is connected to the damper bearing housing in such a way that the elastomer of the damping element is prestressed. In this connection, prestressed means that, at least in one spatial direction of extent, the installation space of the damping element in the damper bearing housing is smaller than the maximum extent of the damping element in this direction of extent.

In the axial direction, the prestress can be determined as the ratio of the height of the installation space to the height of the damping element when it is not installed and is in a relaxed state. A damping element of 6 cm in height that is, for example, installed in an installation space of 5 cm in height gives a prestress of (6-5)/5=20%. Preferred values for the prestress in the axial direction are 5% to 70%, particularly preferably 10% to 50%, in particular 20% to 45%.

In the cross section perpendicular to the axis, the prestress can be determined analogously by establishing the relationship between the maximum extent of the damping element and the extent of the installation space in the same direction. In the case given by way of example of a rotationally symmetrical damping element without elevations on the outer circumferential surface and having a diameter of 11 cm and a similarly rotationally symmetrical installation space having a diameter of 10 cm, the value for the prestress becomes (11-10)/10=10%. If the diameter of the outer circumferential surface of the basic body of the damping element is 10 cm and on the circumferential surface there are elevations with an extent perpendicularly away from the circumferential surface of 0.5 cm, a value of (11-10)/10=10% is likewise obtained for the same installation space. In the case of damping elements or installation spaces that are not rotationally symmetrical, the values for the prestress can be determined analogously but, depending on the geometry, different values are obtained in different spatial directions. Prestresses in a radial direction or in a spatial direction perpendicular to the axis are preferably from 0.1% to 70%, more preferably from 1% to 50%, particularly preferably from 10% to 45%, in particular from 20% to 40%.

In one embodiment according to the invention, the values for the prestress in the axial direction and in the radial direction are different.

In a further preferred embodiment, the damping element is radially prestressed at least between two opposite points. More preferably, the entire outer circumferential surface of the basic body is prestressed.

The invention is further explained below with reference to the drawings, which should be understood as basic representations. They do not constitute any restriction of the invention, for example with regard to actual dimensions or configurational variants of components, and show.

Figure 1:
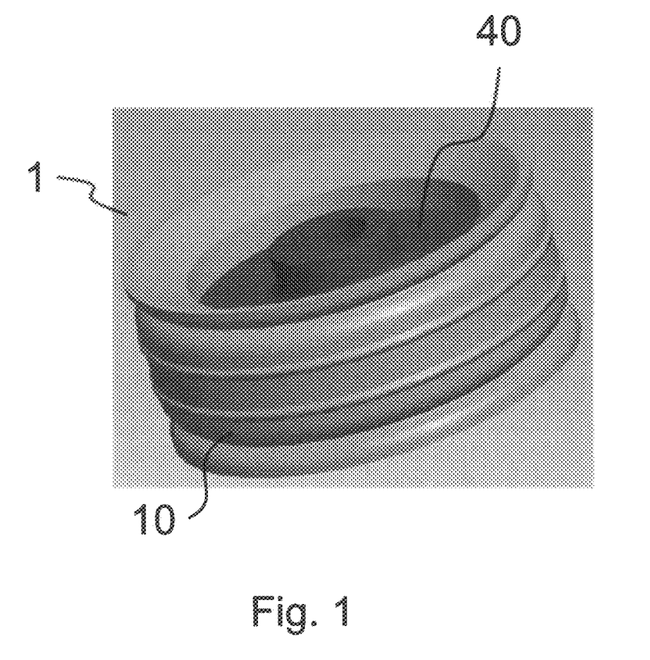
FIG. 1: a damper bearing comprising a damping element according to the invention and an insert

In FIG. 1, a damper bearing 1 with an insert 40 is represented. The outer border of the insert 40 is enclosed in axial and radial directions by a damping element 10 according to the invention.

Figure 2:
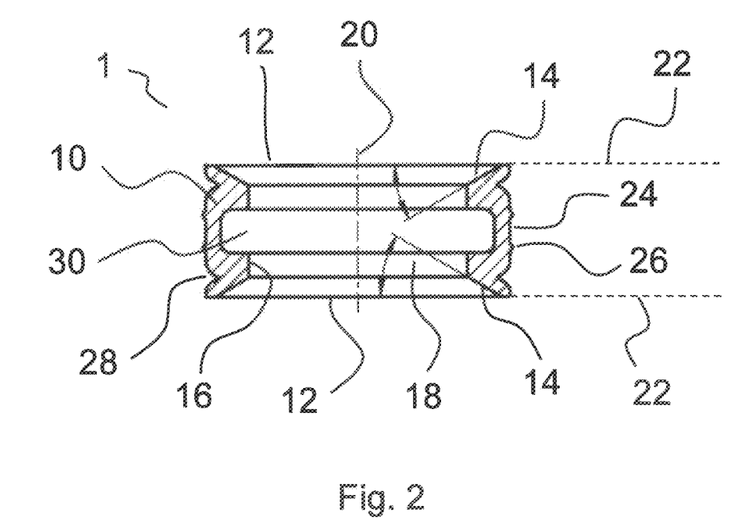
FIG. 2: a longitudinal section through a preferred damping element with an insert

FIG. 2 shows a longitudinal section through a damper bearing 1 with a rotationally symmetrical damping element 10, which has a recess 30 for an insert. The axial end faces 12 have annular areas 14, which are inclined at an angle 18 in relation to the perpendicular to the cylinder axis 20. The increase in the profile height in the axial direction begins at the inner circumferential surface 16 and extends over approximately 80% of the profile width. Over the remaining 20% of the profile width to the outer circumferential surface 24, the profile height remains constant in the example represented. On the circumferential surface 24 there are two peripheral elevations 26 and two peripheral indentations 28.

In the example represented, the upper and lower annular areas of the end faces 12 are symmetrically formed. It goes without saying that damping elements according to the invention may also be unsymmetrical, for example as a result of differently sized angles of slope 14, the form of the increase in the profile height or the increase in the profile height as a proportion of the entire extent of the annular areas over the profile width. Similarly, elevations and indentations may be unsymmetrical both with regard to their number and position on the circumferential surface and with regard to their extent beyond the circumferential surface or proceeding inwardly from it.

Figure 3A:
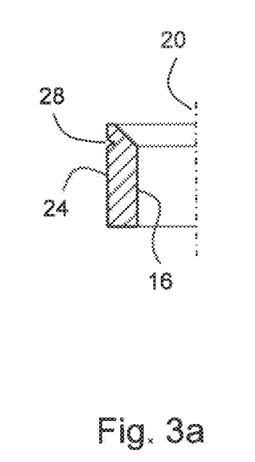
FIG. 3: profiles of end faces of damping elements according to the invention
Figure 3B:
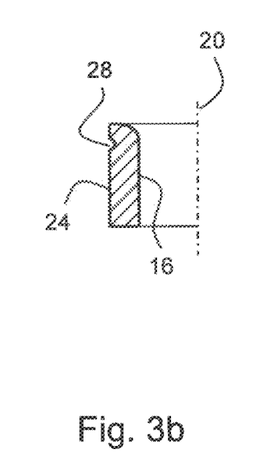
Figure 3C:
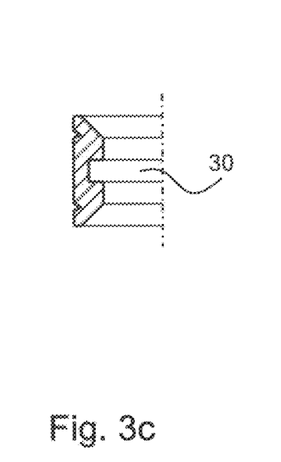
Figure 4A:
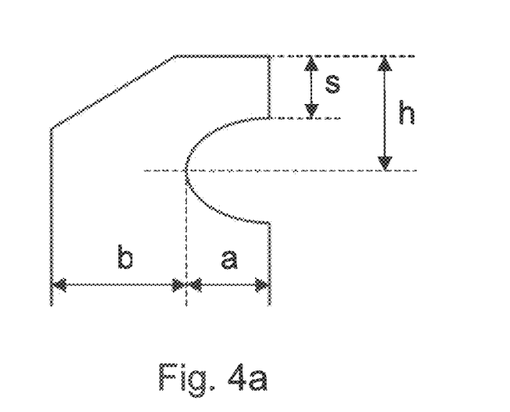
FIG. 4: profiles of end faces of damping elements with a bending lip according to the invention

FIG. 3 schematically show profiles of different embodiments of damping elements according to the invention. Represented in each case is the left half of a longitudinal section through the axis 20 of a rotationally symmetrical damping element with the inner circumferential surface 16 and the outer circumferential surface 24. The illustrations differ in the profiles of the upper end faces. With the exception of FIG. 3*c*, the lower end faces are not shown profiled to provide a simpler representation, but this should not be understood as a restriction of the invention to elements of this kind. Sometimes the profiles have indentations 28 on the inner or outer circumferential surface. In FIG. 3*c* a recess 30 for receiving an insert is shown. The following profiles are specifically represented:

FIG. 3*a*: profile height increasing linearly from the inside outward with an indentation on the outer circumferential surface at the height of the profile base FIG. 3*b*: profile height increasing concavely from the inside outward with an indentation on the outer circumferential surface at the height of the profile base FIG. 3*c*: profile height increasing linearly from the inside outward with an indentation on the outer circumferential surface at the height of the profile base and a recess in the inner circumferential surface for an insert FIG. 4 exemplarily show different embodiments of peripheral indentations on the outer circumferential surface of damping elements resulting in bending lips at the end face. In each case the upper right hand side of a longitudinal section through the axis of a rotationally symmetrical damping element is shown. The letters represent a . . . the extent of the indentation perpendicular to the outer circumferential surface b . . . the remaining thickness at the circumference h . . . the spacing between the centre of the indentation and the highest profile height s . . . the minimum material thickness of the bending lip formed by the indentation In FIG. 4*a* the extent "a" of the indentation is about 40% of the total thickness at the circumference "a+b". Considering the axial direction, the centre of the indentation is positioned below the profile base, the latter being defined by the sharp bend between inner circumferential surface and the increasing end face. The minimum material thickness "s" is reached at the outermost edge of the end face. The profile tip is formed as a plateau which extends from the outside inward over roughly 45% of the thickness at the circumference at the profile base.

Figure 4B:
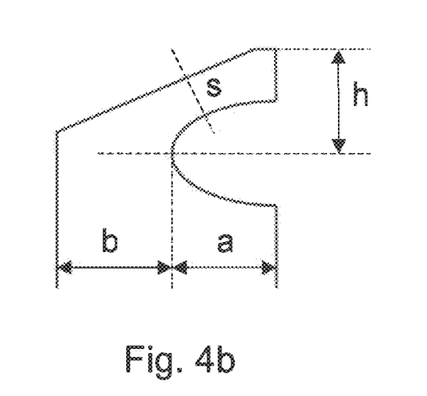

FIG. 4*b* shows a profile similar to that of FIG. 4*a*, however with an extent "a" of the indentation of about 50% of the total thickness at the circumference "a+b" and a smaller angle of slope between the rising end face and the perpendicular to the axis of the damping element. In this example, the minimum material thickness "s" is the minimum spacing between the rising end face and the indentation.

Figure 4C:
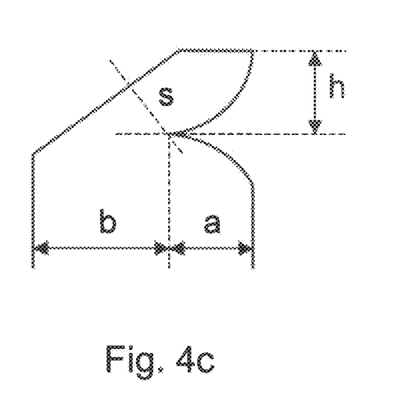

For the exemplarily profile shown in FIG. 4*c* the extent "a" of the indentation is about 40% of the total thickness at the circumference "a+b". Considering the axial direction, the centre of the indentation is positioned above the profile base. In this example the minimum material thickness "s" is the spacing between the deepest indentation perpendicular to the axis and the rising end face.

Figure 5:
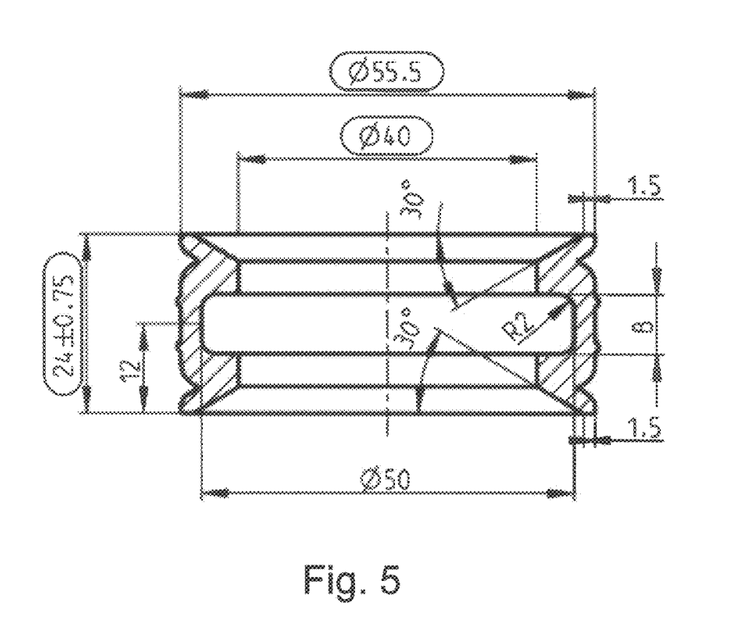
FIG. 5: an exemplary embodiment of an actual damper bearing.

FIG. 5 shows an example of a damper bearing according to the invention with actual dimensions. The indications relate to the unit of measure of a millimeter. The damping element is rotationally symmetrical and has an annular cross section perpendicular to the axis. It has been produced from a cellular polyisocyanate polyaddition product, in that it was first foamed as tubeware. Subsequently, the sloping end faces were created by cutting the damping element out from the tube. The elevations, indentations and the recess for the insert were subsequently produced by turning and milling.

The damping element has an outside diameter of 55.5 mm with a height of 24 mm. The diameter of the inner circumferential surface is 40 mm, so that a thickness at the circumference of 7.75 mm is obtained. The profile of the two end faces is identical. The profile height increases linearly from the inside outward with a slope of 30°. The increase in the profile height is completed after 6.25 mm, the remaining 1.5 mm of the end face in the direction of the outer circumferential surface having a constant height. Thus, all peaks of the profile of the end face are located within an inward extent perpendicular to the outer circumferential surface of 0% to 19.4% relating to the thickness at the circumference at the profile base of 7.75 mm.

Provided in the inner circumferential surface of the damping element is a recess for an insert, which is symmetrically arranged both in the axial direction and in the radial direction. The recess has a diameter of 50 mm with a height of 8 mm. In the radial direction, the recess is consequently 64.5% of the thickness at the circumference.

The peripheral indentations are respectively at the height of the profile base. The peripheral elevations are likewise symmetrically arranged in the axial direction and are axially at the height of the upper and lower ends of the insert.

The invention claimed is:

1. A damper bearing, comprising:
    a damper bearing housing,
    a damping element based on at least one elastomer, the damping element being fitted into the damper bearing housing, the damping element comprising a basic body which has substantially the form of a hollow cylinder with an axis, an outer circumferential surface, an inner circumferential surface and, in the axial direction, two opposite end faces, and
    an insert being form-fitted connected with the damping element by fitting the insert into a recess in the inner circumferential surface,
    wherein at least one of the end faces of the damping element has a profile in which the thickness at the circumference decreases in the axial direction away from the basic body, and wherein the axial profile height of the end face increases from the inner circumferential surface towards the outer circumferential surface,
    wherein the thickness at the circumference of the damping element decreases to such an extent that the thickness at the circumference at the top of the end face corresponds to 0% to 50%, of the thickness at the circumference at the profile base, and
    wherein the elastomer of the damping element is a cellular polyisocyanate polyaddition product.

2. The damper bearing according to claim 1, wherein all peaks of the profile of the end face are located within an inward extent perpendicular to the outer circumferential surface of the basic body of the damping element of from 0% to 50%, relating to the thickness at the circumference at the profile base.

3. The damper bearing according to claim 1, wherein the decrease in the thickness at the circumference of the damping element takes place linearly.

4. The damper bearing according to claim 3, the angle of slope between the rising end face and the perpendicular to the axis of the damping element being from 15° to 60°.

5. The damper bearing according to claim 1, wherein the outer circumferential surface of the basic body of the damping element has at least one indentation, which extends at least partially over the entire circumference, the inward extent of the indentation perpendicularly to the outer circumferential surface is from 1% to 50% of the thickness at the circumference, wherein the remainder of the thickness at the circumference measured outwardly from the inner circumferential surface is not less than 4 mm.

6. The damping element according to claim 5, wherein the at least one indentation extends over the entire circumference of the outer circumferential surface, such that the outer region of the end surface forms a bending lip, the distance between the middle of the indentation and the highest profile height in the axial direction being from 0.2 cm to 1.5.

7. The damper bearing according to claim 1, wherein the basic body of the damping element has an annular cross-sectional area.

8. The damper bearing according to claim 1, wherein the outer diameter of the basic body of the damping element is from 3.5 cm to 8.5 cm, and the height of the damping element is from 1.5 cm to 5 cm.

9. The damper bearing according claim 1, wherein the outer circumferential surface of the basic body of the damping element has at least one elevation, the outward extent of which perpendicularly to the circumferential surface is from 0.5 mm to 8 mm.

10. The damper bearing according to claim 9, wherein the at least one elevation extends over the entire circumference of the outer circumferential surface.

11. The damper bearing according to claim 1, the two end faces of the damping element having a profile in which the thickness at the circumference decreases in the axial direction away from the basic body.

12. The damper bearing according to claim 11, the two end faces of the damping element having the same profile.

13. A method for producing damping elements for installation in a damper bearing according to claim 1 in which the individual damping elements are cut from a prefabricated elastomer tube by means of a cutting tool.

* * * * *